United States Patent [19]

Uhlmann et al.

[11] 4,052,495
[45] Oct. 4, 1977

[54] METHOD OF OBTAINING RELEASE OF POLYURETHANE POLYMERS AND COMPOSITIONS THEREFOR

[75] Inventors: John G. Uhlmann; Joseph A. Colquhoun, both of Midland, Mich.

[73] Assignee: Dow Corning Corporation, Midland, Mich.

[21] Appl. No.: 578,561

[22] Filed: May 19, 1975

[51] Int. Cl.$^2$ .................. B29D 7/02; C08L 83/06
[52] U.S. Cl. .................. 264/216; 260/824 R; 264/213
[58] Field of Search .............. 260/824 R; 264/213, 264/216

[56] References Cited

U.S. PATENT DOCUMENTS

| 3,243,475 | 3/1966 | Reischl et al. | 260/824 R |
|---|---|---|---|
| 3,246,048 | 4/1966 | Haluska | 260/824 R |
| 3,306,869 | 2/1967 | Lahr et al. | 260/824 R |
| 3,342,766 | 9/1967 | Huntington | 260/824 R |
| 3,356,758 | 12/1967 | Omietanski | 260/824 R |
| 3,413,390 | 11/1968 | Heiss | 264/213 |
| 3,480,583 | 11/1969 | Bailey | 260/824 R |
| 3,526,651 | 9/1970 | Rossmy et al. | 260/824 R |
| 3,532,732 | 10/1970 | Rossmy et al. | 260/824 R |
| 3,555,063 | 1/1971 | Nakajima et al. | 260/824 R |
| 3,565,845 | 2/1971 | Johnson | 260/824 R |
| 3,567,499 | 3/1971 | Klebert et al. | 260/824 R |
| 3,600,418 | 8/1971 | Bailey | 260/824 R |
| 3,629,310 | 12/1971 | Bailey | 260/824 R |
| 3,876,485 | 4/1975 | Kinlock | 264/213 |

*Primary Examiner*—Paul Lieberman
*Attorney, Agent, or Firm*—Robert L. McKellar

[57] ABSTRACT

A method of obtaining release of polyurethane polymers from various substrates is disclosed. Compositions which are specifically described siloxane-polyoxyalkylene copolymers give release properties to cured polyurethane polymers.

12 Claims, No Drawings

METHOD OF OBTAINING RELEASE OF POLYURETHANE POLYMERS AND COMPOSITIONS THEREFOR

For many years, the curable polyurethane polymer market has been developing. Generally, when toughness and abrasion resistance are required in a cured product, the choice of material is usually polyurethane polymers.

Other desirable properties are obtained by the correct choice of polyurethane prepolymers which in turn are prepared from a myriad of reactive urethanes and reactive organic compounds.

The methods of manufacture of the urethanes, their properties and their end uses are rife in the literature.

This invention is directed towards the moldable urethanes or urethanes that require lubrication or release during their manufacture.

Such methods of manufacture include, at least, LIM which is liquid injection molding; RIM which is reaction injection molding or LRM which is liquid reaction molding. These terms are interchangeable and essentially mean a method wherein high-pressure impingement mixing and rapid injection of liquid resin components into molds is combined to make molded urethanes. This is in contrast to those methods where the resins are thermoset or thermoplastic and are just heated and pressured into molds. (See Plastics Engineering, January 1975, pages 25-29.)

The automotive market is now the greatest potential user of such molded parts. High volume items such as fascia for interiors, bumpers, fenders and so forth, claim the interest of the industry right now.

Other products include shoe soles and heels, slab stock from which other urethane parts are machined or cut and urethane-based fibers such as Spandex fiber.

What all of these various materials have in common is the fact that sometime during their manufacture they have to come in contact with foreign substrates which bond with them. The manufacture of these materials would thus be enhanced if the manufacturers had some easy, inexpensive way to keep these materials from attaching to or bonding on these foreign substrates.

All methods which prevent bonding to substrates are not suitable for the urethanes.

Materials that are spray-on release agents require repeated application. They are soon removed from the surface of the mold and if the mold is sprayed and has to move through several stages of molding that require release, then the mold has to be retreated. This repeated use is also more expensive owing to the cost of the additional spray, etc.

An answer to the foregoing problem was gained by the use of additives to the urethane polymers. Such additives include polydimethylsiloxane fluids and soaps and surfactant which are known to have release properties.

These additives also have shortcomings, in that, they exude to the surface upon standing. They are incompatible and tend to leave holes and voids in some fast reacting urethane systems. Above all, however, these materials do not give the anticipated release all the time. A good example is the manufacture of urethane slab stock where side-by-side comparisons show polydimethylsiloxane additives give 2 to 4 releases from a mold before the mold is retreated while the materials of the instant invention give many times that many releases.

By release, for purposes of this invention, we mean that the cured urethanes can be removed from the mold in which they were cured.

The force required for removal being equivalent to 200 gms/in or less as measured or a Keil tester described infra.

A further problem with the previous additives is the fact that the additives themselves act as plasticizers in the polyurethane systems and, therefore, tend to affect the physical properties of the cured urethanes in a negative manner.

It is therefore, an object of this invention to provide a method of enhancing the release properties of cured urethane polymers over that of heretofore used additives and/or treatments.

It is a further object of this invention to provide a composition which enhances the release properties of cured urethane polymers over that of heretofore used additives and/or treatments.

It is another object of this invention to prevent the loss of release properties during the manufacture of cured urethane polymers and products.

It is an additional object of this invention to allow the cured urethane polymer producer to manufacture quality products without holes and voids and unnecessary release material buildup on the surface of the product or molds.

It is still another object of this invention to allow the manufacture of quality products whose desirable physical properties are retained while optimum release properties are obtained.

Yet another object is to allow the manufacturer to more economically produce the cured polyurethane polymers by virtue of the fact that excessive down time is eliminated, fewer product rejects are encountered and there is less additive use because of the staying power of the inventive siloxane-polyoxyalkylene compositions.

It has now been found that the use of certain, specifically defined, reactive, siloxane-polyoxyalkylene copolymers as release compositions in polyurethane curable polymers gives the resulting cured polymer release properties which will not leave the curable urethane polymer during manufacture, will not cause excessive buildup on the final products or molds, will not cause holes and voids in the final product, will not alter the overall physical properties of the final cured product significantly and will allow the manufacturer increased economic benefit, while enhancing the release properties of the cured urethane polymer over that of previously utilized release materials.

The objects of this invention are met by utilizing the method and compositions of this invention which method consists of preparing a cured urethane polymer which method consists of (I) introducing into an uncured urethane polymer from 0.5 to 5 weight percent based on the weight of the urethane polymer and siloxane-polyoxyalkylene copolymer, a siloxane-polyoxyalkylene copolymer selected from the group consisting of

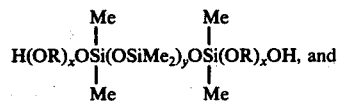

(A)

(B)

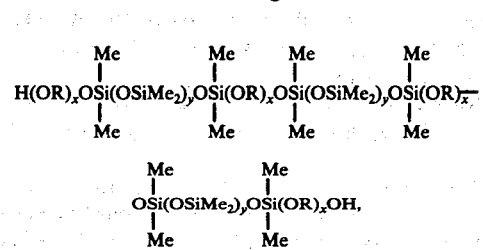

wherein each x has an average value of 3 to 45, each y has an average value of 8 to 198, Me is a methyl radical, wherein $-(OR)_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $-(OR)-$ block ranges from 2.0/1 to 2.9/1, (II) curing the urethane polymer while in contact with a substrate, whereby the siloxane-polyoxyalkylene copolymer is reacted into the urethane polymer, and (III) releasing the cured urethane polymer from said substrate.

In this invention, the terms "polyurethane polymer" and "urethane polymer" have essentially the same meaning.

This method involves the addition of the above defined reactive siloxane-polyoxyalkylene copolymer to the basic urethane polymer before the cure takes place.

The basic urethane polymer can be, for purposes of this invention, any curable polyurethane polymer, whether the cure is carried out at or near room temperature or at temperatures above room temperature.

The basic urethane polymers are those prepared from reactive organic compounds such as hydroxyl functional polyesters and polyethers, isocyanato, amino and mercapto functional organic polymers and isocyanate functional organic compounds. These materials are well known in the art and can be found reported on very extensively in the literature. Such materials are found, for example, in U.S. Pat. Nos. 2,729,618 and 2,620,516.

Further information can be found in Golding, "Polymers and Resins," Van Nostrand, 1959, pages 325 et seq. Also, Saunders and Frisch, "Polyurethanes, Chemistry and Technology," Part II, Interscience Publishers, 1964, among others. The materials of these references are hereby incorporated by reference.

Generally, the urethane polymers are prepared by reacting an isocyanate with some organic polymeric material containing a functional group reactive with the isocyanate. A typical example is the reaction product of a dihydroxy functional polyether and/or a trihydroxy functional polyether with toluene diisocyanate, such that all of the OH is reacted to form urethane linkages leaving isocyanate groups for further reaction. This type of reaction product is termed a prepolymer which may cure by itself on exposure to moisture or by the stoichiometric addition of polycarbinols or other polyfunctional reactive materials which react with isocyanate.

For more details, reference can be made to the Golding book noted above.

It is important that the curable urethanes used in this invention are reactive and that they have not been cured prior to the introduction of the siloxane-polyoxyalkylene compositions of this invention.

The usual method of this invention is to add the reactive siloxane-polyoxyalkylene copolymer to the uncured urethane polymer just prior to cure. Since the siloxane-polyoxyalkylene copolymer itself is reactive towards isocyanates, it causes the urethane polymer to react with it and, therefore, it usually is not added until just prior to the cure reaction of the urethane polymer.

On the other hand, it is within the scope of this invention to incorporate the siloxane-polyoxyalkylene into the reactive polyurethane prepolymer and then eventually react the prepolymer with a crosslinker or curing agent to obtain the final product, the cured urethane polymer.

The manner of addition of the siloxane-polyoxyalkylene compositions of this invention to the uncured urethane polymer is not critical, that is, they can just simply be stirred in, dispersed or mixed through a mixing head at high pressure. The method is immaterial as long as the siloxane-polyoxyalkylene compositions of this invention are evenly dispersed throughout the curable urethane polymer.

The uncured urethane polymer is thereafter cured either with or without the aid of a catalyst or with or without the aid of increased temperatures.

An important aspect of this invention is the reactive siloxane-polyoxyalkylene copolymer.

There are, in fact, several critical aspects to the invention which those skilled in the art must pay heed to.

The most important aspect of this invention is the fact that the siloxane-polyoxyalkylene copolymer of this invention is reactive with the uncured urethane polymer.

The siloxane-oxyalkylene copolymers of this invention contain primary hydroxyl groups on their terminal ends. These primary hydroxyl groups react with the polyurethane polymers spontaneously at room temperature and, therefore, usually do not need catalysts.

Therefore, no special circumstances are required in order to react the copolymer with the polyurethane polymer. It is possible that the difunctional siloxane-polyoxyalkylene can be substituted for part of the carbinol curing agents in most systems.

The siloxane-polyoxyalkylene copolymer has to be at least difunctional, that is, the preferred siloxane-polyoxyalkylene copolymers of this invention are usually difunctional but also contain a small amount of a branched species which is inherently present due to the way the precursors of the siloxane-polyoxyalkylene copolymers are prepared, thus, small amounts of multi-functional siloxane-polyoxyalkylene copolymers, present in the essentially linear siloxane-polyoxyalkylene, can be tolerated and are within the scope of this invention. Such "smaller amounts" of branched species means less than 0.1 weight percent based on the weight of the siloxane-polyoxyalkylene copolymer.

Of equal importance is the presence or absence of unreacted species in the final product of siloxane-polyoxyalkylene copolymer. It is very important that nearly all species in the final product be at least difunctionally reactive. That is, no or essentially no monofunctional material should be present as such material detracts from the physical properties of the final cured urethane elastomer. When reactivity is discussed in this specification, the term has a limited meaning, that is, it refers only to those functional groups which are reactive with the isocyanate groups of the uncured urethane polymer. This "urethane-reactive functional group" for purposes of this invention refers generally to primary hydroxyl groups on carbon, i.e., $CH_2OH$.

The physical properties of the cured urethane polymer can be affected in several ways by the inclusion of the monofunctional material in the siloxane-polyoxyalkylene copolymer described below. First, the monofunctional material is generally capped on one end by hydroxy (the functional end) and on the other end by an unsaturated group (the non-functional end). The hydroxy end reacts with the isocyanate of the uncured urethane polymer and in effect endblocks such polymer, thus, reducing the chain extension and crosslinking of the urethane polymer. Secondly, the monofunctional material which remains unreacted acts as a plasticizer in the cured polyurethane polymer and, in effect, reduces the physical properties.

Previously release materials for these urethanes have, in fact, caused the same alteration in physical properties as just described and, therefore, preventing such loss of properties by using the inventive compositions is an advance in the art.

The reaction used for preparing the siloxane-polyoxyalkylene copolymer is also important. Thus, any reaction which causes the presence of the monofunctional species is not applicable in the instant invention.

By way of example, there is a well-known reaction whereby the siloxane-polyoxyalkylene copolymers are prepared that are analogous in structure to the instant siloxane-polyoxyalkylene copolymers except that they have Si-C bonds connecting the siloxane and the polyoxyalkylene blocks while the instant invention has siloxane-polyoxyalkylene blocks linked by Si-O-C bonds.

This reaction is $\equiv SiH + C\equiv CC-OH \xrightarrow{Pt\Delta} \equiv SiCC-C-OH$. This reaction never goes to 100 percent completion and so there is always present a portion of the monofunctional species, i.e., $C\equiv CC-OH$ which, as indicated above, gives rise to loss of physical properties when incorporated in a cured urethane polymer.

In contrast, the reaction used to prepare the siloxane-polyoxyalkylene copolymers of the instant invention can be illustrated generally as

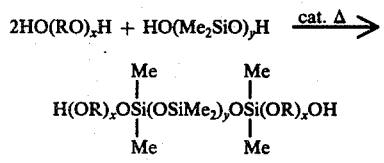

and the composition (B) noted above, where the catalyst is any acid condensation catalyst which is not a strong rearranging catalyst such as dodecylbenzenesulphonic acid, toluene sulphonic acid or the like.

The typical reaction would include the reaction of dihydroxy functional polyethers and dihydroxy functional linear siloxanes in a solvent solution (preferably toluene), at 40 to 75% solids, under the influence of a condensation catalyst at the reflux temperature of the mixture for several hours.

The reflux temperature ranges from 80° to 130° C. depending on the reactants, type of solvent and quantity of solvent present.

The reflux time can vary from 3 to 15 hours wherein the time is dependent on the amount of water of reaction that is removed. 100% of the water of reaction should be removed and it is accomplished within the 3 to 15 hour time span. Preferably, the reaction is run from 4 to 10 hours for the most benefits to be derived from the reaction, such as cost factors, etc.

The mole ratio of the carbinol of the starting polyether to the silanol of the starting linear polydimethylsiloxane is important. For purposes of this invention, the ratio should be 2/1 to 0.5/1.

Because of the fact that the precursor, linear polydimethylsiloxanes react faster than the carbinols under the influence of condensation catalysts, this invention also includes siloxane-polyoxyalkylene copolymers having an ABABABA type of structure, i.e., where two ABA type of copolymers are connected together by a difunctional siloxane unit.

Such a material can be, for instance,

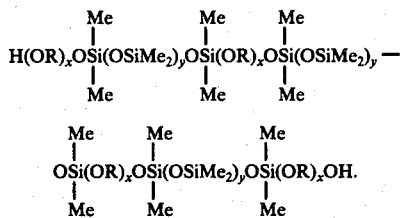

The chances of arriving at the ABABABA type of molecule are greater when the mole ratio of total carbinol to total silanol is in favor of the silanol, that is, the closer one moves to the ratio of 0.5/1, the greater are the chances that the ABABABA type of polymer will be formed.

Because of the fact that the precursor, linear polydimethylsiloxane is subject to self-condensation under the influence of condensation catalysts, this invention includes siloxane-polyoxyalkylene copolymers wherein the molecular weight of the siloxane portion of the final copolymer is greater than the molecular weight of the precursor, linear polydimethylsiloxane. That is, the value of $y$ in the final product is 8 to 198.

It is important to note that both the starting materials are at least difunctional. There are at least two reasons for this. First, if the polyether does not react 100% with the polysiloxane, any remaining material is still difunctional. Thus, one prevents the presence of any monofunctional materials and, hence, the reduction of physical properties in the final cured urethane polymer is not observed.

Secondly, the fact that the polyether is difunctional guarantees that the chances of being reacted with the polysiloxane are much greater than if the polyether was only monofunctional.

The third important aspect of this invention is the fact that the polyethers of this invention used to make the siloxane-polyoxyalkylene copolymer are special polyethers, that is, even though the scope of the invention includes polymers of ethylene, propylene and butylene oxides and copolymers thereof, it is imperative that such polymers and copolymers have primary hydroxyl groups as the functional group. This is in contrast to the secondary hydroxyls that are usually found in polymers and copolymers containing propylene oxide. Naturally, the straight ethylene and butylene oxide based polyethers already have primary hydroxyl groups and need no further treatment. The copolymers which contain propylene oxide have to be endblocked with small amounts of ethylene oxide or butylene oxide in order to furnish primary hydroxyls to the copolymer. Such materials are commercial products and one common example is the Pluronic ® line of polyethers produced by BASF-Wyandotte, Wyandotte, Mich. Typical materials under that tradename include L31, L61 and L81.

The use of these special primary hydroxylated polymers and copolymers is necessary so that the reaction between the polyether carbinol and the polysiloxane silanol is easier to effect. Primary carbinols react much more readily than secondary carbinols. A second reason is that these carbinols react more readily with the urethane system, thus, insuring that the siloxane-polyoxyalkylene is also reacted into that system.

For purposes of this invention, the polyethers that are the precursors for the siloxane-polyoxyalkylene copolymer can be derived from polyoxyethylene, polyoxybutylene or copolymers of polyoxyethylene, polyoxybutylene and polyoxypropylene. The precursor polyethers have molecular weights within the range of 200 to 2000 and when the polyether is composed of propylene radicals and radicals selected from the group consisting of ethylene and butylene radicals, the amount of propylene radicals relative to the other alkylene radicals should be such that the ratio of carbon atoms to oxygen atoms in the total polyether ranges from 2.0/1 to 2.9/1. This allows for up to 90% propylene oxide copolymerized with ethylene oxide and up to 5% butylene oxide copolymerized with the propylene oxide. This definition includes copolymers of ethylene oxide and butylene oxide and homopolymers of both ethylene oxide and butylene oxide.

Of further importance in the use of the siloxane-polyoxyalkylene copolymers is the fact that they must be essentially linear. If they are branched or have multi-functionality, they tend to crosslink and make undesirable cures in the cured urethane polymers. Thus, the preferred siloxane-polyoxyalkylene materials are essentially linear.

The polysiloxanes which are the precursors to the siloxane-polyoxyalkylene are generally those considered to be low molecular weight, that is, they have molecular weights ranging from about 750 to 3700. The polysiloxanes of this invention are essentially linear, hydroxy endblocked polydimethylsiloxane fluids. The molecular weight of these polydimethylsiloxanes of 750 to 3700 is based on the average molecular weight and thus, various methods may be used to arrive at the average molecular weight such as blending siloxanes so that the average molecular weight falls in the range of 750 to 3700.

As indicated earlier, the siloxanes are essentially linear, however, siloxanes containing a small amount of branch points and slightly more than an average of two equivalents of silanol per molecule are within the scope of this invention.

The polysiloxane precursor and the polyether precursor are mixed together, in solvent, and then catalyzed with a non-rearranging acid catalyst.

The siloxane and polyether is mixed in the ratio of total moles of carbinol to total moles of silanol of from 2/1 to 0.5/1.

This range of ratios gives the optimum release values and involves a total siloxane content of 30 to 85 weight percent in the copolymer based on the total weight of polyether and siloxane in the copolymer.

Higher ratios than 2/1 gives a big excess of glycol which is not desirable because the siloxane release effect is diluted and a ratio of less than 0.5/1 gives a high silanol content which is also undesirable because the formation of very high molecular siloxanes is enhanced.

After the addition of the catalyst, the reactants are stirred and heated for several hours, cooled, stripped under vacuum to remove the solvent, neutralized with $Ca(OH)_2$ or $NaHCO_3$ or the like and then filtered.

The resulting product may or may not be turbid depending on the ratio of polyether to siloxane, the molecular weight of each, and the type of polyether.

The fact that the product is not wholly compatible is not indicative of the performance of the product. The materials which appear both clear and turbid at 100% solids function in this invention equally well.

The reactive siloxane-polyoxyalkylene is then added to the curable urethane polymer and allowed to react into the urethane polymer. No special conditions are required to effect this reaction.

The reactive siloxane-polyoxyalkylene copolymer is added to the reactive urethane polymer in a quantity 0.5 to 5 weight percent based upon the weight of the total copolymer-urethane system.

The most beneficial range for the copolymer in this invention is about 1 to 4 weight percent based on the weight of the total siloxane-polyoxyalkylene/reactive urethane system. The preferred range is 1.5 to 3.0 percent.

The following examples are illustrative only and should not be construed as limiting the invention.

EXAMPLE 1

Preparation of a siloxane-polyoxyalkylene of this invention.

Into a 2 l., 3-necked flask was placed 425 gms. of a hydroxyl endblocked polydimethylsiloxane having a silanol content of approximately 1.5% by weight and a value of $y$ of 30.6, 75 gms. of an ethylene oxide based polyether of the formula $HO(CH_2CH_2O)_9H$ and 500 gms. of toluene. To the flask was fitted a stirrer, thermometer and Dean-Stark water collection trap. The material was refluxed for 15 minutes to remove free water and then 2.5 gms. of a 10% solution in toluene of dodecylbenzenesulphonic acid was added. The material was refluxed for 4 hours at which time it was clear and pale straw colored. 2.5 gms. of $Ca(OH)_2$ were added and it was stirred for 1 hour while cooling. It was then filtered and stripped under vacuum at 60° C. to yield a turbid fluid. It had a viscosity of 880 cs. at 25° C.

EXAMPLE 2

In an apparatus similar to that found in Example 1, was added 112 gms. of a polysiloxane having 11.8 ($Me_2SiO$) units and a hydroxyl value of 3.9 weight percent, 112 gms. of another polysiloxane having 33.4 ($Me_2SiO$) units and a hydroxyl content of 1.37 weight percent, 225 gms. of a polyether having the formula $HO(CH_2CH_2O)_{14}H$ and 400 gms. of toluene.

The mixture was heated ½ hour to reflux and then 0.25 gms. of dodecylbenzenesulphonic acid in toluene was added. The mixture was heated for 3 hours and then 2 gms. of $Ca(OH)_2$ was added. When it was cooled, it was filtered and stripped to yield a fluid having a viscosity of 720 cs. at 25° C.

EXAMPLE 3

Using a method similar to that of Example 1, two inventive copolymers were prepared;
  A. the copolymer of Example 1; and
  B. the copolymer of Example 2.

The above copolymers were tested in side-by-side evaluations in a curable urethane polymer for their releasing ability with prior art materials:

C. a commercial release agent

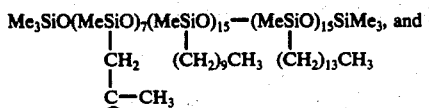

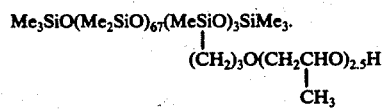

The above materials (A), (B), (C) and (D) were introduced into the urethane polymer in the following manner.

The urethane polymer was a polyether based isocyanate functional prepolymer. This prepolymer was simultaneously mixed with another mixture consisting of
1. 1,4-butane diol (crosslinker)
2. triethylenediamine (catalyst)
3. the compound (A), (B), (C) or (D)
4. a small amount of water.

The urethane prepolymer and the mixture were mixed and agitated vigorously for 15 seconds. They were then poured into stainless steel molds which had been preheated to 140° F. These steel molds have a hinged lid which can be bolted to the bottom of the mold. The mold is 8 × 8 × ¼ inch deep.

After the stirring of the urethane polymer and the mixture, it is poured into the stainless steel mold, the lid is bolted down and the cure allowed to proceed for 60 seconds.

After cooling slightly, the lid is raised and the product is removed from the mold. Both the ability to raise the lid and the ease of removal of the cured urethane slab from the mold are considered indicia of releasing ability. The more urethane pieces one can mold, the better the release characteristics.

| Material | Quan. of Copolymer in the Urethane System | Releases from Mold |
|---|---|---|
| A | 3% | 11+ |
| B | 1% | 22+ |
| C | 2% | 4 |
| D | 2% | 4 |

In the above test, the materials A and B had continued release abilities at the values shown. The reason for stopping at 11 and 22 was that the quantity of experimental fluid had run out.

In samples C and D, the molds had to be shut down because the lids started to seize.

The physical properties of the inventive urethane compositions can be illustrated by the following:

| Material | p.s.i. Tens. | % Elong. | Die B Tear | Modulus × 10³ |
|---|---|---|---|---|
| Urethane Polymer (control) | 3100 | 240 | 430 | 24 |
| A at 1% | 2850 | 180 | 415 | 22 |
| A at 3% | 2750 | 160 | 370 | 18 |

A second batch urethane polymer analogous to that prepared above was prepared by the method set forth above:

| Material | % Elon. | Die B Tear |
|---|---|---|
| Urethane Polymer | 270 | 140 |
| A at 1% | 270 | 130 |
| A at 3% | 257 | 113 |

Thus, it can be seen that very improved release can be obtained, that the release stays for many moldings and the physical properties of the cured urethane polymer are not significantly altered.

EXAMPLE 4

A comparison study was carried out using prior art materials and a material from this invention. The materials were
A. the copolymer from Example 2.
B. the commercial release agent from Example 3(C).
C. a Me₃Si endblocked polydimethylsiloxane fluid of 1000 cs. viscosity.
D. a commercial surfactant manufactured by the Dow Corning Corporation known as DC 193 ® and which is a copolymer of polydimethylsiloxane and a copolymer polyether of ethylene oxide and propylene oxide units.

All of the above materials were tested as internal release agents in a commercial polyurethane system, i.e., Mobay F-242. Mobay F-242 is a polyester based isocyanate functional polymer manufactured by Mobay Chemical Company, Pittsburg, Pa.

The polyurethane system (25 gms) was heated in a cup to 160° F. 0.5 gms of each of the above materials was added to such a heated system. There was then added 1.75 gms of 1,4-butanediol as a curing agent and crosslinker.

The materials were stirred until homogeneous and then immediately poured unto a steel 3 × 9 inches panel which has a 2½ × 8 inches rubber dam built upon it. The dam was approximately ¼ inch high and was capable of receiving 20 gms of the stirred urethane.

The 2½ × 8 × ¼ inch rubber dam allowed the formation of a 2½ × 8 inches strip which was approximately ¼ inch thick. The materials were then heated overnight to cure them at 210° F., they were cooled and cut into ¼ inch strips.

The strips were then pulled from the steel using a Keil tester at a rate of 13 inches/min. The upper limit of the tester is 2000 gms of pull.

The Keil tester is a well-known apparatus for determining adhesive strengths. For detailed instructions in the use of and significance of test results, reference should be made to TAPPI, 43 (8), 164A-5A, (August, 1960).

For the instant test results, the Keil test was modified slightly. Instead of using a piece of pressuresensitive tape which has been adhered to a steel panel, the pull was made on the cured urethane polymer instead. Another modification was that the pulled strips were only ½ inch wide instead of 1 inch as suggested by the TAPPI article.

| Material | Gms Pull |
|---|---|
| A. | 100 |

| Material | Gms Pull | |
|---|---|---|
| B. | 2000+ | (reached limited of tester) |
| C. | 2000+ | (reached limit of tester) |
| D. | 1500 | |

That which is claimed is:

1. A method of releasing non-cellular cured urethane polymers from substrates, which method consists of
   I. introducing into an uncured non-cellular urethane polymer from 0.5 to 5 weight percent based on the weight of the non-cellular urethane polymer and siloxane-polyoxyalkylene copolymer, a siloxane-polyoxyalkylene copolymer selected from the group consisting of

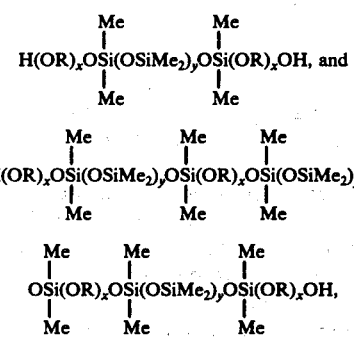

wherein each $x$ has an average value of 3 to 45, each $y$ has an average value of 8 to 198, Me is a methyl radical, wherein $-(OR)_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $-(OR)-$ block ranges from 2.0/1 to 2.9/1,
   II. curing the non-cellular urethane polymer while in contact with a substrate, whereby the siloxane-polyoxyalkylene copolymer is reacted into the non-cellular urethane polymer, and
   III. releasing the cured non-cellular urethane-polymer from said substrate.

2. A method as claimed in claim 1 wherein $-(OR)-$ is $-(OCH_2CH_2)-$, $x$ has an average value of 9, and $y$ has an average value of 60.

3. A method as claimed in claim 1 wherein $-(OR)-$ is $-(OCH_2CH_2)-$, $x$ has an average value of 13.5, and $y$ has an average value of 50.

4. A method as claimed in claim 1 wherein $-(OR)-$ is a copolymer of polyoxyethylene and polyoxypropylene, the ratio of carbon atoms to oxygen atoms in the total $-(OR)-$ block is 2.9/1, $x$ has an average value of 37, $y$ has an average value of 50.

5. A method as claimed in claim 1 wherein $-(OR)-$ is $-(OCH_2CH_2)$, $x$ has an average value of 9, $y$ has an average value of 100.

6. A method as claimed in claim 1 wherein $-(OR)-$ is $-(OCH_2CH_2)$, $x$ has an average value of 13.5 and $y$ has an average value of 60.

7. A composition of matter which consists of
   A. a curable non-celluar urethane polymer;
   B. from 0.5 to 5 weight percent based on the weight of the total composition, of a siloxane-polyoxyalkylene copolymer selected from the group consisting of

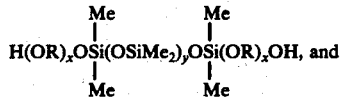

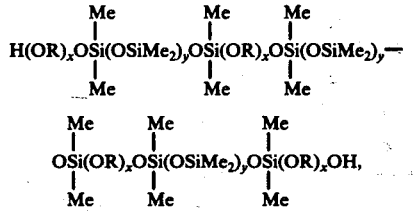

wherein each $x$ has an average value of 3 to 45, each $y$ has an average value of 8 to 198, Me is a methyl radical, wherein $-(OR)_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $-(OR)-$ block ranges from 2.0/1 to 2.9/1.

8. A composition of matter as claimed in claim 7 wherein R is ethylene, $x$ has an average value of 13.5 and $y$ has an average value of 50.

9. The method as claimed in claim 1 wherein (A) containing (B) is cured at room temperature.

10. The method as claimed in claim 1 wherein (A) containing (B) is cured at a temperature above room temperature.

11. A composition of matter which consists of
    A. a cellular cured urethane polymer containing reacted therein
    B. from 0.5 to 5 weight percent based on the weight of the total composition, of a siloxane-polyoxyalkylene copolymer selected from the group consisting of

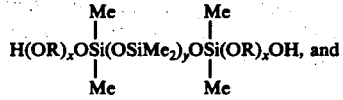

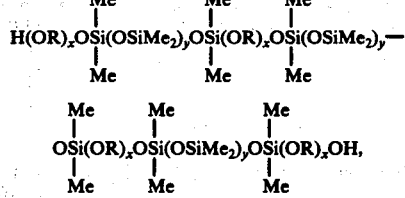

wherein each $x$ has an average value of 3 to 45, each $y$ has an average value of 8 to 198, Me is a methyl radical, wherein $-(OR)_x$ is a polyoxyalkylene polymer or copolymer wherein R is composed of ethylene radicals or butylene radicals and mixtures of ethylene or butylene radicals with propylene radicals, the amount of ethylene or butylene radicals relative to the propylene radicals being such that the ratio of carbon atoms to oxygen atoms in the total $-OR-$ block ranges from 2.0/1 to 2.9/1.

12. A composition of matter as claimed in claim 11 wherein R is ethylene, $x$ has an average value of 13.5 and $y$ has an average value of 50.

* * * * *

UNITED STATES PATENT AND TRADEMARK OFFICE
CERTIFICATE OF CORRECTION

PATENT NO. : 4,052,495

DATED : October 4, 1977

INVENTOR(S) : John G. Uhlmann; Joseph A. Colquhoun

It is certified that error appears in the above-identified patent and that said Letters Patent are hereby corrected as shown below:

Column 2, line 5, the word "or" second occurrence should read --on--.

Column 11, line 3, the phrase "(reached limited of tester)" should read --(reached limit of tester)--.

Column 11, Claim 5, line 60, the formula "$(OCH_2CH_y$" should read --$(OCH_2CH_2)$, Column 11, Claim 6, line 63, the formula "$(OCH_2CH_y$" should read --$(OCH_2CH_2)$, Column 12, Claim 11, line 36, the phrase "a cellular" should read --a non-cellular--.

Column 12, Claim 11, line 63, the formula "-OR-" should read --$(OR)$--.

Signed and Sealed this

First Day of September 1981

[SEAL]

Attest:

Attesting Officer

GERALD J. MOSSINGHOFF

Commissioner of Patents and Trademarks